(12) United States Patent
Schmidt

(10) Patent No.: US 6,511,075 B1
(45) Date of Patent: Jan. 28, 2003

(54) ELASTOMER SEAL BETWEEN A PISTON AND A CYLINDER OR A SHAFT ON AN AUTOMATIC TRANSMISSION

(75) Inventor: Henning Schmidt, Ahrensburg (DE)

(73) Assignee: Dichtungstechnik G. Bruss GmbH & Co., Hamburg (DE)

( * ) Notice: Subject to any disclaimer, the term of this patent is extended or adjusted under 35 U.S.C. 154(b) by 0 days.

(21) Appl. No.: 09/531,560

(22) Filed: Mar. 20, 2000

(30) Foreign Application Priority Data

Apr. 1, 1999 (DE) .......................................... 199 15 022

(51) Int. Cl.$^7$ .......................... B60T 11/236; F16J 9/20; F16J 15/32
(52) U.S. Cl. ........................ 277/436; 277/437; 277/549; 277/551; 277/560
(58) Field of Search ................................ 277/436, 437, 277/438, 439, 434, 435, 549, 551, 560

(56) References Cited

U.S. PATENT DOCUMENTS

| | | | | |
|---|---|---|---|---|
| 2,859,078 A | * | 11/1958 | Jacobs | |
| 3,008,781 A | * | 11/1961 | Milster | |
| 3,465,650 A | * | 9/1969 | Gluck | |
| 3,913,460 A | * | 10/1975 | Wright | |
| 4,521,027 A | * | 6/1985 | Marshall | |
| 4,601,235 A | * | 7/1986 | Roberts | |
| 4,601,374 A | * | 7/1986 | Ladin | |
| 5,353,689 A | * | 10/1994 | Bolt et al. | |
| 5,385,081 A | * | 1/1995 | Sneddon | |
| 5,577,641 A | * | 11/1996 | De Laforcade et al. | |
| 5,813,313 A | * | 9/1998 | Stoll et al. | 92/244 |
| 6,056,293 A | * | 5/2000 | Visconti | |
| 6,164,659 A | * | 12/2000 | Netzer et al. | |

\* cited by examiner

Primary Examiner—Anthony Knight
Assistant Examiner—Vishal Patel
(74) Attorney, Agent, or Firm—Duane Morris LLP

(57) ABSTRACT

An elastomer seal between a piston and a cylinder or a shaft of an automatic automobile transmission.

An elastomer seal between a piston and a cylinder or a shaft of an automatic automobile transmission, the piston and cylinder or shaft carrying out translatory movement with respect to each other, when in operation, comprising a sealing lip which bridges a gap between the circumference of a supporting body of the piston and a sealing surface of the cylinder or shaft and is pressed against this sealing surface, the elastomer seal being bonded to the supporting body by an adhesive, is characterized in that the supporting body has a radial surface which is engaged axially by an end of the elastomer seal remote from the lip, said end especially starting at a radial spacing from the circumference of the supporting body, which spacing is dimensioned sufficiently great to block elastomer material from flowing across when the elastomer seal is molded to the piston, and that the circumference of the supporting body comprises a circumferential surface which is free of sealing material and defines a gap with the sealing surface of minimized gap width.

6 Claims, 4 Drawing Sheets

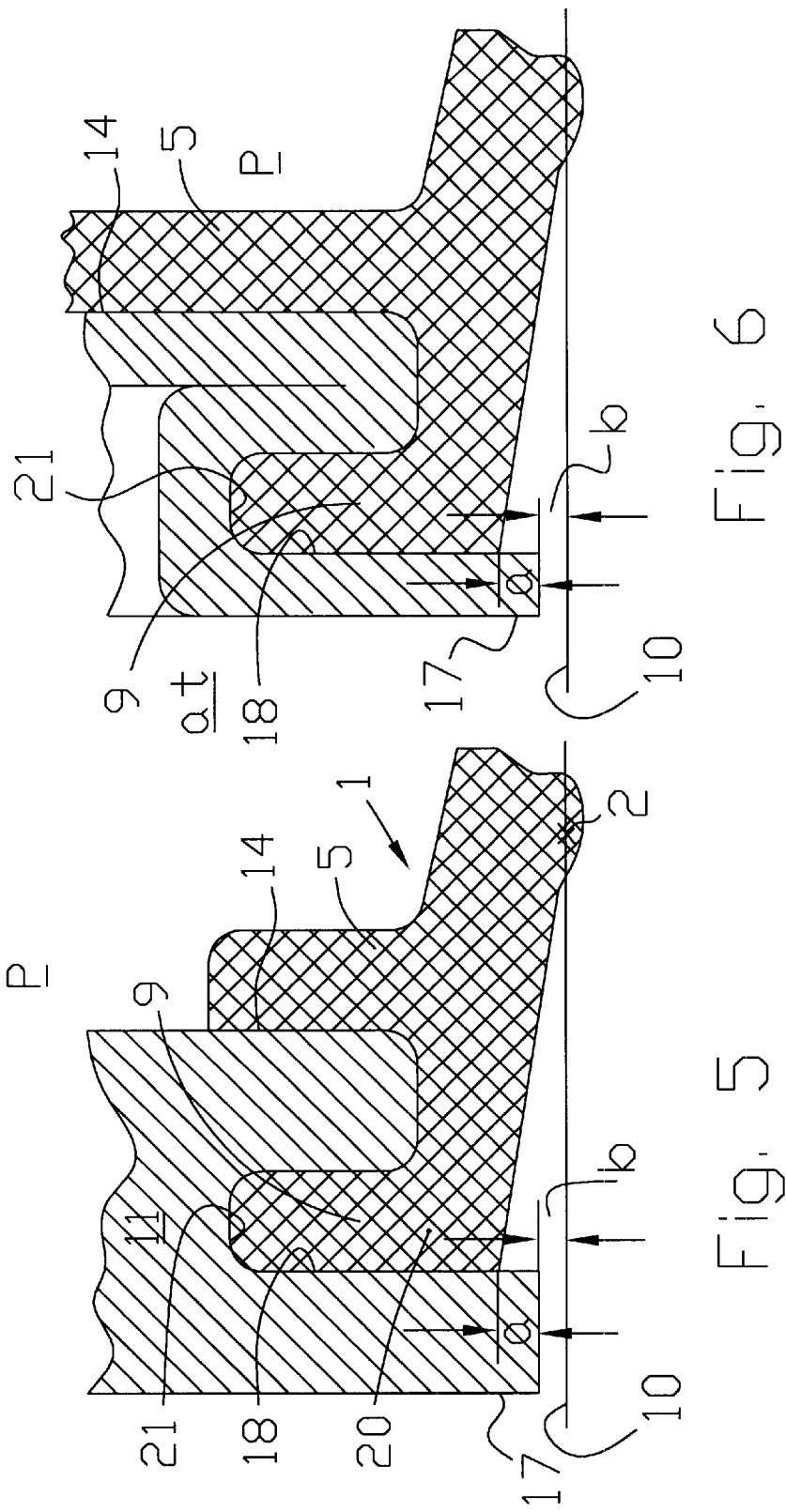

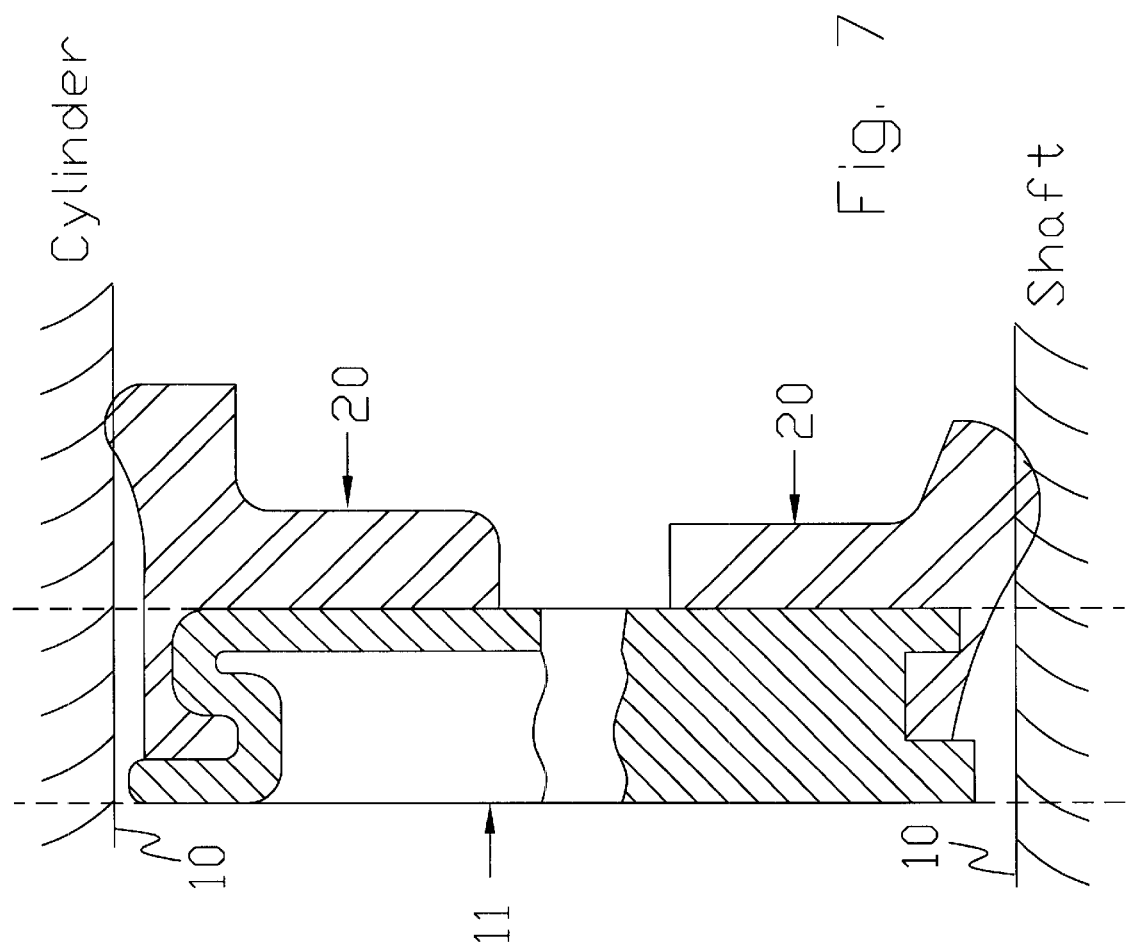

ELASTOMER SEAL BETWEEN A PISTON AND A CYLINDER OR A SHAFT ON AN AUTOMATIC TRANSMISSION

An elastomer seal between a piston and a cylinder or a shaft of an automatic automobile transmission.

FIELD OF THE INVENTION

The instant invention relates to an elastomer seal between a piston and a cylinder or a shaft of an automatic automobile transmission, the piston and cylinder or shaft carrying out translatory or linear movement with respect to each other, when in operation.

BACKGROUND OF THE INVENTION

Fluid operated pistons in the mechanical portion of automatic motor vehicle transmissions serve to shift multiple disc clutches or brake bands. Such pistons are exposed to high fluid operating pressures of up to 20 bars, the fluid usually being an hydraulic fluid. Failure of such a piston normally results in failure of the entire transmission. For this reason the component parts of the piston, including the elastomer seal between the piston and a cylinder or shaft along which the piston travels must meet demands of very high reliability.

It is known to join an elastomer seal for a piston of the kind described to the support body of the piston by vulcanizing. Pistons of such structure are referred to as "compound pistons". An example of a compound piston of this kind is illustrated in FIG. 1. It shows an elastomer seal 1, including a sealing lip 2 which extends around a gap (c) to be sealed against a sealing surface 10, the seal being vulcanized to a circumferential surface 3 which faces the cylinder or shaft. Both sides 13, 14 of the support body 11 are framed by radial flanges 4, 5 of the elastomer seal, while a web 12 which interconnects the flanges covers the periphery 15 and thus partly fills the gap (c) towards the sealing surface 10. During the vulcanizing process the elastomer flows, adopting the U-shaped configuration depicted in FIG. 1. In reality, the dimension of the gap (c) is approximately 1 mm.

The piston is moved in the direction of arrow f by hydraulic pressure p exerted on the right side of the compound piston 1, while atmosperic pressure prevails at the left side, as see in FIG. 1. The pressure p raises the contact pressure of the sealing lip 2 against the sealing surface 10 and, at the same time, generates a thrust or shear force directed radially inwardly at the adhesion joint between the leg 5 of the elastomer seal 1 and the sidewall 14, the extent of this shear force being great, in dependence on the gap width (c). If a permissible shear force is exceeded, the adhesive bond will be broken, with resulting failure of the elastomer seal and thus of the compound piston.

An elastomer seal for an annular piston of an hydraulic clutch disengaging device, which piston is movable linearly on a guide sleeve, is described in German patent application laid open DE 196 14 385 A1. A clearance between the annular piston and the guide sleeve is neither defined in the specification nor indicated in the drawings.

SUMMARY OF THE INVENTION

It is the object of the instant invention to design an elastomer seal of the kind defined initially such that the shear forces in the adhesion joint between the elastomer seal and the supporting body are minimized. It is also an object of the invention to obtain the joining of the elastomer seal to the piston by an automated inexpensive manufacturing process.

Claim 1 serves to meet those objects.

Advantageous modifications are protected by the subclaims. In a particularly advantageous further development a bead formed at the end of the elastomer seal remote from the lip is seated in a groove in the circumference of the supporting body and likewise adhered to the same. This presents a combination of the advantages of a normal seal form-locked in a groove and those of a bond obtained by vulcanizing while using an adhesive. The shearing stress acting in the adhesion joint is reduced to minimum values because the axial force generated by the operating pressure and acting on the sealing lip is transmitted almost entirely directly to the supporting body. Examinations of embodiments as defined in claim 4 have revealed that the shear forces in the adhesion joint are reduce to less than one tenth of the shear forces acting in the adhesion joint of the known embodiment as illustrated in FIG. 1.

It is pointed out expressly that an elastomer seal according to the invention is useful both with solid piston designs and with annular pistons. In the latter case, a seal according to the invention is provided not only at the inner diameter but also at the outer diameter, the seal at the inner diameter acting with respect to a central shaft and the seal at the outer diameter acting with respect to the inside wall of a cylinder.

BRIEF DESCRIPTION OF THE DRAWING

The invention will be described further, by way of example, with reference to the accompanying diagrammatic drawings, all of which are part elevations of a compound piston including a supporting body and an elastomer seal joined to the same by vulcanizing. They are depicted with respect to a sealing surface of a shaft or cylinder. In the drawings:

FIG. 5 shows a third embodiment according to the invention;

FIG. 6 shows a modification of the third embodiment, including a piston which is made of drawn sheet steel.

FIG. 7 shows a fourth embodiment according to the invention.

DESCRIPTION OF PREFERRED EMBODIMENTS

Figure 1:
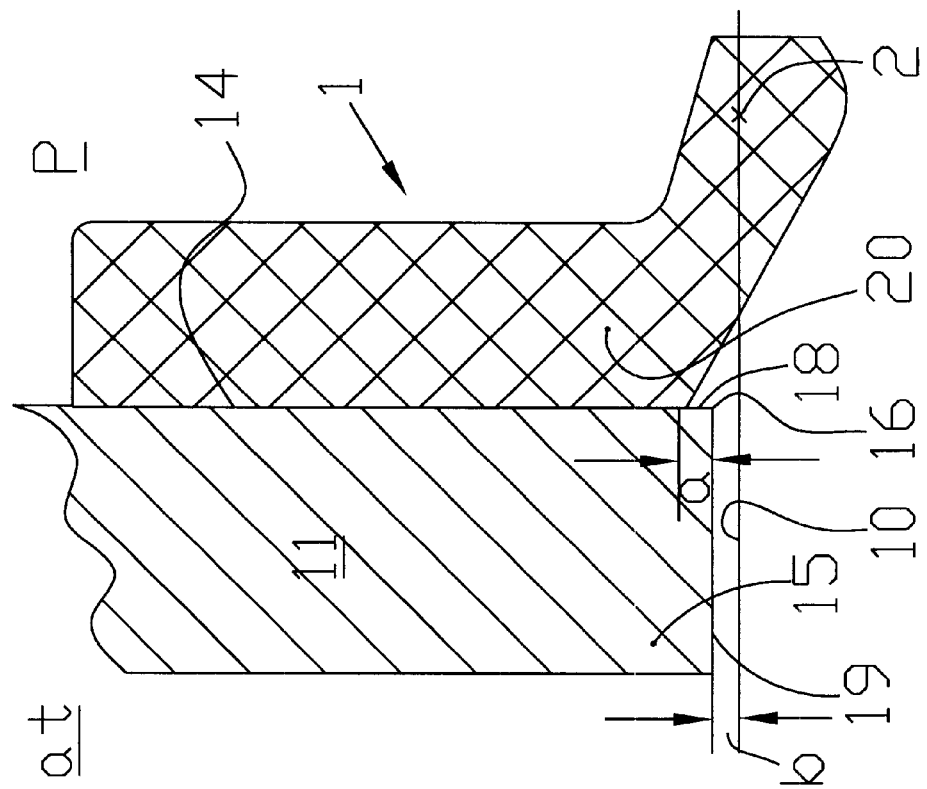
FIG. 1 illustrates a known compound piston as described above.

For the sake of simplicity, like members or members having like functions are marked by the same reference numerals in FIGS. 2 to 6 as in FIG. 1.

Figure 2:
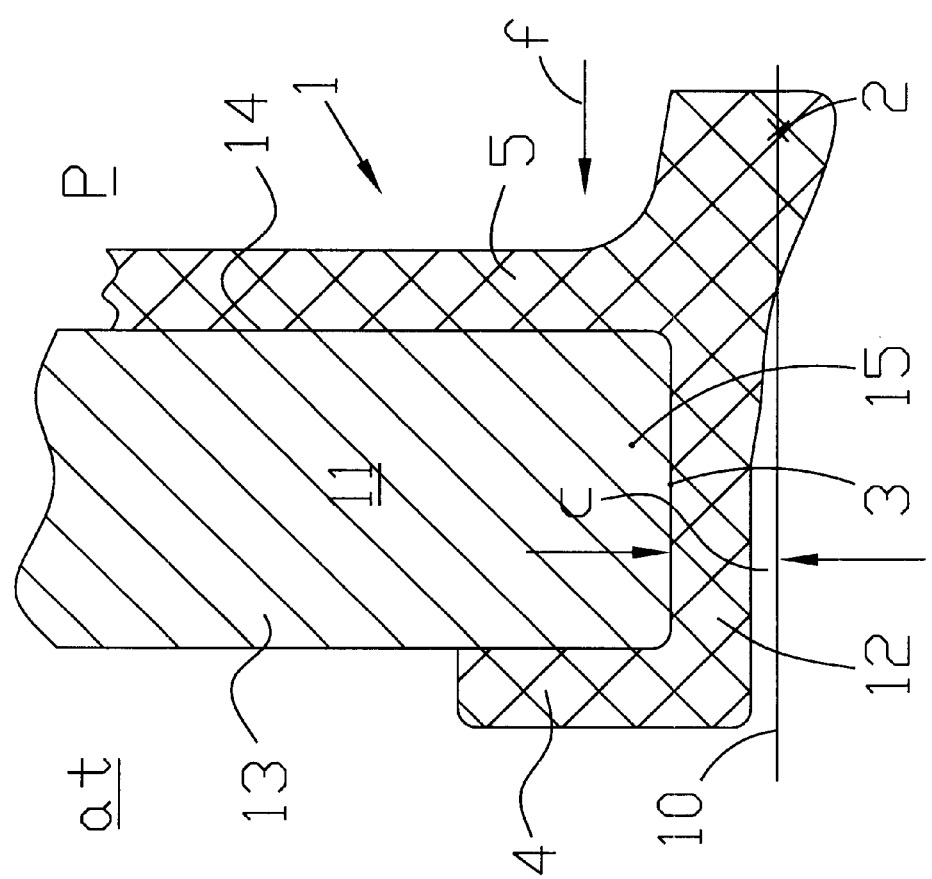
FIG. 2 shows a first embodiment of a compound piston with an elastomer seal according to the invention.

A compound piston as illustrated in FIG. 2 includes a supporting body 11 designed as a flat plate, e.g. an annular plate having sidewalls 13, 14 and a circumferential surface 15, similar to the embodiment shown in FIG. 1. However, an elastomer seal 1 is of L-shaped configuration and joined by vulcanizing to only one radical sidewall 14 of the supporting body 11. That leg of the elastomer seal which comprises the sealing lip 2 starts at a spacing (a) above the circumferential surface 15. This spacing (a) is approximately 0.5 mm and, therefore, sufficient to prevent the elastomer material from flowing around the peripheral edge 16 of the supporting body, thereby entering into the gap between the sealing surface 10 and the circumferential surface 15. The width (b) of the gap is minimized, being in the order of b=0.2 mm. In practice, the gap width (b) may vary between 0.1 and 0.3 mm, depending on the thermal expansion of the materials used. Larger gap widths (b) may be provided in practice when light metal (aluminum) is used, whereas smaller gap widths (b) apply when steel is used as the piston material. Due to the small gap width (b) the deformation of the sealing lip 2 is greatly reduced when the seal is subjected to the action of an axial force in the direction of arrow f. Thus also the shear stress in the adhesion joint between the sidewall 14 and the flange 5 of the elastomer seal 1 is greatly reduced. As a result, there is much less risk of the adhesion joint between the elastomer seal 1 and the supporting body 11 breaking.

Figure 3:
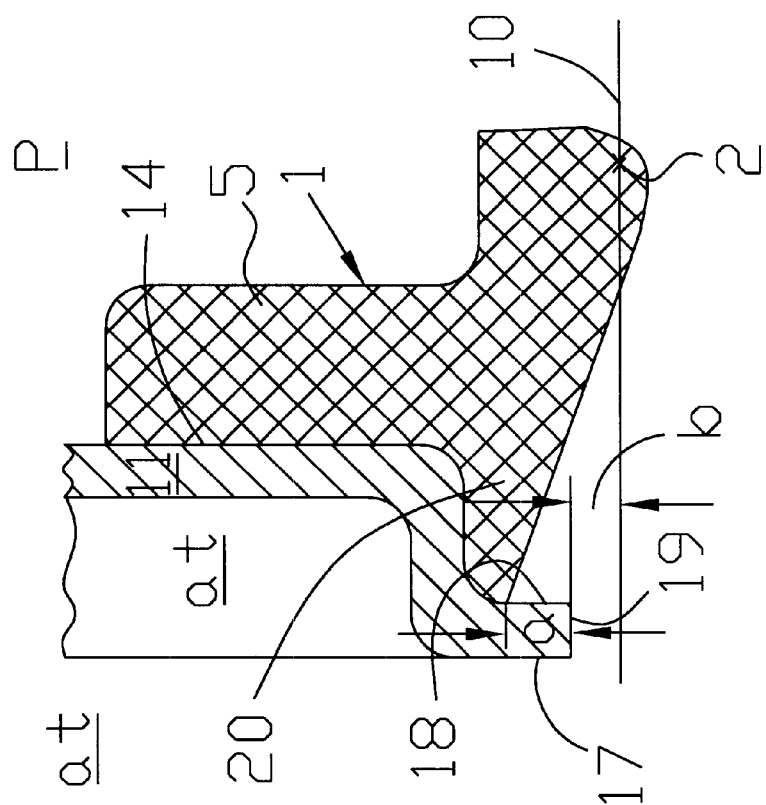
FIG. 3 shows a second embodiment of a compound piston according to the invention.
Figure 4:
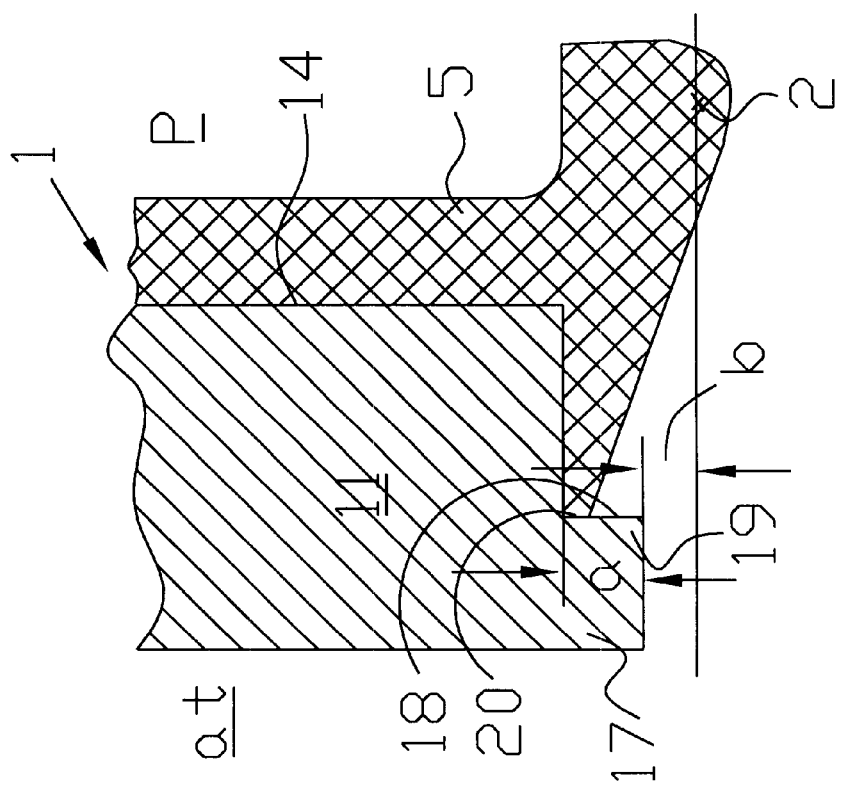
FIG. 4 shows a modification of the second embodiment, including a supporting body which is made of drawn sheet steel.

In the embodiments according to FIGS. 3 and 4 the supporting body 11 presents a step 17 having a radial surface 18 and an axial surface 19 in the area of its periphery. The axial surface 19 defines a gap of minimized gap with (b) in the order of 0.2 mm with the sealing surface 10. In these embodiments the elastomer seal 1 is T-shaped in cross section, the right side of the T bar which is inclined, as shown, including the sealing lip 2, whereas the left side presents an end 20 remoted from the lip and in engagement with the radial surface 18 of the step 17.

The embodiment according to FIG. 3 shows a supporting body 11 made of solid material, while the embodiment according to FIG. 4 shows a supporting body 11 which is drawn of sheet steel. That is the only difference between the embodiments of FIGS. 3 and 4.

FIG. 5 presents a particularly preferred embodiment of the invention. The supporting body 11 in this case is made either of light metal, for example an aluminum alloy, or of a sufficiently resistant plastic material. The periphery of the supporting body 11 is formed with an annular groove 21 adjacent the step 17 which also in this embodiment includes and defines a gap of minimized gap width (b), as described above, with the sealing surface 10. A bead 9 formed at the free left end of the elastomer seal 1 is received in the annular groove 21. Here, the radial wall 18 of the step 17 constitutes the left sidewall of the annular groove 21. The shear forces in the radial adhesion zones between the elastomer seal 1 and the supporting body 11 are reduced to less than one tenth as compared to the compound piston shown in FIG. 1 because of the cooperation of the annular portion 21 and the bead 9 molded into the same and because of the minimized gap width (b) which is in the order of 0.25 mm.

The embodiment shown in FIG. 6 differs from the one according to FIG. 5 only in that the supporting piston is embodied by a member of drawn and upset sheet steel material. FIG. 7 illustrates another exemplary embodiment, wherein the piston body 1 has a first elastomer seal 20 and a second elastomer seal 22 located at opposing ends of the piston body 11. One of the elastomer seals 20 or 22 is used to seal the gap between the shaft and the piston body, while the other elastomer seal is used to seal the gap between the cylinder and piston body.

The features disclosed in the specification above and in the claims and drawings may be significant for implementing the invention in its various modifications, both individually and in any combination.

What is claimed:

1. Apparatus comprising:
   a hollow cylinder having an inwardly facing circumferential sealing surface;
   an annular supporting body positioned within the cylinder for movement along the axis thereof, said body having a first radial flange and a second radial flange, said first flange extending further radially towards said sealing surface than said second flange but both of said flanges being radially spaced from said sealing surface, said flanges defining a groove therebetween; and
   an elastomer seal connected adhesively to the second radial flange of said body, said seal having a bead portion at one end extending radially inwardly into said groove, an intermediate portion axially extending from said groove between said second flange and said sealing surface but not between said first flange and said sealing surface, and an axially extending portion at the other end axially extending beyond said second flange, said axially extending portion having a sealing lip in sliding contact with said sealing surface to thereby provide a seal between said sealing surface and said body at a point axially displaced from said flanges, said first flange radially extending beyond the bead portion of said seal approximately 0.5 mm to thereby prevent the elastomer material of said seal from entering the gap between said sealing surface and said first flange.

2. The apparatus of claim 1 wherein the spacing between said first flange and said sealing surface is approximately 0.2 mm.

3. The apparatus of claim 1 wherein the elastomer seal is connected adhesively to the second radiant flange by vulcanization.

4. Apparatus comprising:
   a hollow cylinder having a radially inwardly facing circumferential first sealing surface;
   a shaft having a radially outwardly racing circumferential second sealing surface;
   a supporting body positioned between said cylinder and said shaft, said body forming an annulus with a first radially outward facing surface proximate to said first sealing surface and a second inwardly facing surface proximate to said shaft sealing surface, said body having first and second radially extending flanges with said first flange extending further radially towards the proximate one of said sealing surfaces than said second flange but both of said flanges being radially spaced from the proximate one of said sealing surfaces, said flanges defining a groove therebetween; and
   an elastomer seal connected adhesively to the second radial flange of said body, said seal having a bead portion at one end extending radially inwardly into said groove, an intermediate portion axially extending from said groove between said second flange and the proximate one of said sealing surfaces but not between said first flange and the proximate one of said sealing surfaces, and an axially extending portion at the other end axially extending beyond said second flange, said axially extending portion having a sealing lip in sliding contact with the proximate one of said sealing surfaces to thereby provide sealing contact axially displaced from said flanges between said body and said cylinder and said body and said shaft, said first flange radially extending beyond the bead portion of said seal approximately 0.5 mm to thereby prevent the elastomer material of said seal from entering the gap between said sealing surface and said first flange.

5. The apparatus of claim 4 wherein the elastomer seal is connected adhesively to the second radial flange by vulcanization.

6. The apparatus of claim 4 wherein the elastomer seal is connected adhesively to the second radial flange by vulcanization.

* * * * *